(12) United States Patent
Okamura et al.

(10) Patent No.: US 9,969,889 B2
(45) Date of Patent: May 15, 2018

(54) CORROSION-RESISTANT STRUCTURE FOR HIGH-TEMPERATURE WATER SYSTEM AND CORROSION-PREVENTING METHOD THEREOF

(71) Applicant: KABUSHIKI KAISHA TOSHIBA, Minato-ku (JP)

(72) Inventors: Masato Okamura, Tokyo (JP); Osamu Shibasaki, Tokyo (JP); Koji Negishi, Minato-ku (JP); Seiji Yamamoto, Minato-ku (JP); Hajime Hirasawa, Minato-ku (JP); Kenji Yamazaki, Minato-ku (JP); Tetsuji Kaneko, Minato-ku (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 303 days.

(21) Appl. No.: 14/692,339

(22) Filed: Apr. 21, 2015

(65) Prior Publication Data
US 2015/0299474 A1 Oct. 22, 2015

Related U.S. Application Data

(62) Division of application No. 13/510,008, filed as application No. PCT/JP2010/070355 on Nov. 16, 2010, now Pat. No. 9,062,878.

(30) Foreign Application Priority Data

Nov. 16, 2009 (JP) ................................ 2009-260933

(51) Int. Cl.
*C09D 5/08* (2006.01)
*C23F 11/18* (2006.01)
(Continued)

(52) U.S. Cl.
CPC .................. *C09D 5/08* (2013.01); *C08K 3/22* (2013.01); *C08K 3/26* (2013.01); *C08K 5/098* (2013.01);
(Continued)

(58) Field of Classification Search
None
See application file for complete search history.

(56) References Cited

U.S. PATENT DOCUMENTS 5,448,605 A 9/1995 Hettiarachchi
5,600,691 A 2/1997 Hettiarachchi et al.
(Continued)

FOREIGN PATENT DOCUMENTS

CN 100420722 C 9/2008
EP 0 790 621 A1 8/1997
(Continued)

OTHER PUBLICATIONS

Brossard et. al. Surface and Coatings Technology, 185, 2004, 275-282.*
(Continued)

*Primary Examiner* — Vera Katz
(74) *Attorney, Agent, or Firm* — Oblon, McClelland, Maier & Neustadt, L.L.P.

(57) ABSTRACT

The present invention provides a corrosion-resistant structure for a high-temperature water system comprising: a structural material 1; and a corrosion-resistant film 3 formed from a substance containing at least one of La and Y deposited on a surface in a side that comes in contact with a cooling water 4, of the structural material 1 which constitutes the high-temperature water system that passes a cooling water 4 of high temperature therein. Due to above construction, there can be provided the corrosion-resistant structure and a corrosion-preventing method capable of
(Continued)

operating a plant without conducting a water chemistry control of cooling water by injecting chemicals.

12 Claims, 4 Drawing Sheets

(51) Int. Cl.
| | |
|---|---|
| C23F 11/08 | (2006.01) |
| F01D 5/28 | (2006.01) |
| F16L 58/08 | (2006.01) |
| F22B 37/02 | (2006.01) |
| F22B 37/10 | (2006.01) |
| C08K 3/22 | (2006.01) |
| C08K 3/26 | (2006.01) |
| C08K 5/098 | (2006.01) |
| G21D 1/00 | (2006.01) |

(52) U.S. Cl.
CPC ............ $C23F\ 11/08$ (2013.01); $C23F\ 11/18$ (2013.01); $C23F\ 11/185$ (2013.01); $F01D\ 5/288$ (2013.01); $F16L\ 58/08$ (2013.01); $F22B\ 37/025$ (2013.01); $F22B\ 37/108$ (2013.01); $C08K\ 2003/221$ (2013.01); $F05D\ 2220/31$ (2013.01); $G21D\ 1/00$ (2013.01); $Y10T\ 428/273$ (2015.01)

(56) References Cited

U.S. PATENT DOCUMENTS

| | | | |
|---|---|---|---|
| 5,600,692 A | 2/1997 | Hettiarachchi | |
| 5,602,888 A | 2/1997 | Hettiarachchi et al. | |
| 5,608,766 A | 3/1997 | Andresen et al. | |
| 5,625,656 A | 4/1997 | Hettiarachchi et al. | |
| 5,719,911 A | 2/1998 | Hettiarachchi et al. | |
| 5,768,330 A | 6/1998 | Andresen et al. | |
| 5,773,096 A | 6/1998 | Hettiarachchi et al. | |
| 5,774,516 A | 6/1998 | Hettiarachchi et al. | |
| 5,805,653 A | 9/1998 | Hettiarachchi et al. | |
| 5,818,893 A | 10/1998 | Hettiarachchi | |
| 5,904,991 A | 5/1999 | Hettiarachchi | |
| 6,024,805 A | 2/2000 | Kim et al. | |
| 6,254,980 B1 | 7/2001 | Tadokoro et al. | |
| 6,312,571 B1 | 11/2001 | Nara et al. | |
| 6,724,854 B1 | 4/2004 | Kim et al. | |
| 2002/0104407 A1 | 8/2002 | Kim et al. | |
| 2004/0022346 A1 | 2/2004 | Kim et al. | |
| 2004/0186201 A1* | 9/2004 | Stoffer | C09C 1/56 523/215 |
| 2005/0069078 A1 | 3/2005 | Stellwag et al. | |
| 2006/0243602 A1* | 11/2006 | Andresen | B01J 23/06 205/724 |
| 2006/0261311 A1 | 11/2006 | Poulet et al. | |
| 2006/0269760 A1 | 11/2006 | Sugama | |
| 2007/0100190 A1 | 5/2007 | Cimino et al. | |
| 2008/0096045 A1* | 4/2008 | Fairbourn | C23C 18/04 428/641 |
| 2009/0084682 A1* | 4/2009 | McMillen | C09D 5/4488 205/50 |
| 2009/0175773 A1 | 7/2009 | Chen et al. | |

FOREIGN PATENT DOCUMENTS

| | | |
|---|---|---|
| EP | 2 395 130 A1 | 12/2011 |
| JP | 8 226 994 | 9/1996 |
| JP | 2003 528329 | 9/2003 |
| JP | 2005 10160 | 1/2005 |
| JP | 2005 265449 | 9/2005 |
| JP | 2007 516309 | 6/2007 |
| TW | 200511326 A | 3/2005 |

OTHER PUBLICATIONS

International Search Report dated Feb. 15, 2011 in PCT/JP10/70355 Filed Nov. 16, 2010.
International Preliminary Report on Patentability dated Jun. 12, 2012 in PCT/JP10/70355 Filed Nov. 16, 2010.
Onoda, et al. Materials Chemistry and Physics 73,, 2002, 19-23.
Chinese Office Action dated May 22, 2013, in China Patent Application No. 201080051758.8 (with English translation).
Combined Chinese Office Action and Search Report dated May 13, 2014, in Patent Application No. 201080051758.8 (with English-language translation).
Extended European Search Report dated Apr. 22, 2015 in Patent Application No. 10830047.6.

* cited by examiner

CORROSION-RESISTANT STRUCTURE FOR HIGH-TEMPERATURE WATER SYSTEM AND CORROSION-PREVENTING METHOD THEREOF

CROSS REFERENCE TO RELATED APPLICATIONS

The present application is a divisional of U.S. patent application Ser. No. 13/510,008, filed on May 16, 2012, the text of which is incorporated by reference, which is a National Stage entry under 35 U. S. C. 371 of PCT/JP10/070355, filed on Nov. 16, 2010 and claims priority to Japanese Patent Application No. 2009-260933, filed on Nov. 16, 2009.

TECHNICAL FIELD

The present invention relates to a corrosion-resistant structure and a corrosion-preventing method for a high-temperature water system, and particularly relates to the corrosion-resistant structure and the corrosion-preventing method for the high-temperature water system, which can effectively prevent the corrosion of a structural material that constitutes a secondary cooling system of a pressurized-water type nuclear power plant (atomic power generation facility) and can effectively reduce the elution of a ferrous component and the like from the structural material.

BACKGROUND ART

The pressurized-water type nuclear power station (atomic power generation facility) is a reactor facility which heats pressurized water (light water with high pressure) that is a primary coolant to 300° C. or higher with thermal energy generated by a nuclear fission reaction, boils a light water of a secondary coolant with a steam generator to eventually convert the light water into steam of high temperature and high pressure, and rotates a turbine generator by using the steam to generate an electric power. This pressurized-water type reactor is used for large-sized plants such as a nuclear power station, and small plants such as a nuclear vessel (atomic-powered ship).

In various plants that include the above described pressurized-water type atomic power generation facility and have a boiler, a steam generator, a heat exchanger and/or the like, in which high-temperature water circulates, it becomes a big problem that ions elute from the metal of the structural material or the structural material itself corrodes. The elution of the metal ions is a representative phenomenon occurring in the high-temperature water, and the elution causes the corrosion of structural members of pipes and equipments, including the structural material, and eventually gives various influences such as an operational problem and the increase of maintenance frequency, on the plant.

In addition, the eluted metal ions from the structural material and the like adhere to and deposit on a surface of the pipes in the system, or a high-temperature site of the steam generator and the like, as an oxide, and there is a possibility that impurities form a highly concentrated state, in a narrow portion such as a crevice portion between a heat transfer tubing and a tube-support-plate in a heat exchanger. The impurities also may form an ion-enriched water having strong acidity or strong alkalinity according to the ion balance, and further cause remarkable corrosion.

A phenomenon of corrosion cracking in the structural material is also confirmed which is caused by such a phenomenon and a rise of an electrochemical potential due to the oxide which adheres to the surface. Heat transfer also decreases due to the adhering oxide, and accordingly it is needed to remove the oxide on the structural material by chemical cleaning or the like periodically with a high frequency.

On the other hand, there has been a high possibility in recent years that the thickness of a carbon steel pipe decreases due to a wall-thinning phenomenon of the pipe and such an accident that the pipe is ruptured also occurs. Thus, the elution, the corrosion phenomenon and the like of the metal are accumulated with time during a plant operation in a long period of time, and potentially show a possibility of suddenly erupting into a disaster at some point when the accumulated amount has reached to a durable limit.

Furthermore, the above described corrosion rate is accelerated depending on a shape of a structural site, and a phenomenon which is difficult to be predicted may occur. For instance, in a piping system in which many equipments such as an orifice and a valve are used, erosion or corrosion is caused by the flow of a fluid of high temperature such as a cooling water which passes through the inner space at a high speed. In order to avoid such a problem, various corrosion mitigation methods including a water chemistry control have been conventionally implemented in various plant systems.

For instance, in the secondary cooling system of a thermal power station and a pressurized-water type nuclear power station, such measures are taken as to control a pH in a cooling water by injecting ammonia or hydrazine, thereby decrease the elution of iron from the inside of the system and prevent the inflow of the iron component to the steam generator (Patent Literature 1).

Furthermore, in order to eliminate the enrichment of alkaline components in the crevice portion, various water chemistry controls have been implemented in an actual plant, such as the control of an Na/Cl ratio, the control of chloride ion concentration for decreasing an influence of a chlorine ion on corrosion, and the control of dissolved oxygen concentration (Patent Literature 2). In recent years, a water chemistry control method is also adopted which uses improved chemicals such as ethanolamine and morpholine.

As described above, various technologies for controlling the water chemistry have been proposed as an improved proposal, in addition to the measures which have been already implemented in the actual plant, such as reductions of the corrosion of pipes, the adhesion and deposition of an oxide and the like, and the enrichment of eluted components in the crevice portion. As for the improvement of the chemicals to be injected, for instance, there is a method of using an organic acid such as tannic acid and ascorbic acid as an oxygen scavenger (Patent Literature 3).

In addition, as for the water chemistry control method, there are proposed an operation method of controlling a molar ratio of all cations/$SO_4$ (Patent Literature 2), a method of introducing at least one of a calcium compound and a magnesium compound into feed water to a steam generator for a reactor so that the ion concentration becomes 0.4 to 0.8 ppb (Patent Literature 2), and the like.

Thus, the measures of suppressing corrosion and elution by water chemistry control with the use of the chemicals are widely implemented under present circumstances as a measure of preventing the corrosion and elution of a plant structural material. However, such a technology is desired which can operate the plant without controlling a water chemistry of the cooling water by injecting the chemicals, from the viewpoints of the complexity of operation management, an operation cost and the safety.

CITATION LIST

Patent Literature

Patent Literature 1: Japanese Patent No. 2848672
Patent Literature 2: Japanese Patent No. 3492144
Patent Literature 3: Japanese Patent Laid-Open No. 2004-12162

SUMMARY OF INVENTION

Problems to Be Solved by the Invention

A present secondary cooling system of a pressurized-water type atomic power generation facility is operated in a state of having a chemical agent such as hydrazine and ammonium injected therein so as to suppress its corrosion. A new technology is necessary in order to enable the plant to be operated without the injection of the chemicals.

Then, an object of the present invention is to provide a corrosion-resistant structure and a corrosion-preventing method for a high-temperature water system, which can easily operate the plant while obtaining an effective corrosion-preventing effect, not by controlling the water chemistry of a cooling water by injecting the chemicals into the structure, but by providing a technology of modifying a surface of a structural material.

Means for Solving the Problems

In order to achieve the above described object, a corrosion-resistant structure for a high-temperature water system according to one embodiment of the present invention has a corrosion-resistant film formed from a substance containing at least one of La and Y deposited on a surface in a side that comes in contact with a cooling water, of a structural material which constitutes the high-temperature water system that passes a cooling water of high temperature therein.

The corrosion-resistant film which is formed from the substance containing at least one of La and Y and has deposited on the surface can effectively prevent the corrosion of the structural material, and can greatly reduce the elution of a metal component such as iron from a cooling water contact surface of the structural material.

In the corrosion-resistant structure for the high-temperature water system, the temperature of the cooling water of high temperature is preferably 20° C. or higher and 350° C. or lower. The above described corrosion-preventing effect of the corrosion-resistant film which has deposited on the surface of the structural material shows an anticorrosive effect in a wide temperature range from the above described ordinary temperature to an operation temperature of the secondary cooling system of the pressurized-water type atomic power generation facility.

Furthermore, in the above corrosion-resistant structure of the high-temperature water system, the substance containing La is preferably at least one La compound selected from $La_2O_3$, $La(OH)_3$, $La_2(CO_3)_3$, $La(CH_3COO)_3$ and $La_2(C_2O_4)_3$. Any one of these La compounds shows an excellent anticorrosive effect when being contained in the corrosion-resistant film.

In the corrosion-resistant structure for the high-temperature water system, the substance containing Y is preferably at least one Y compound selected from $Y(OH)_3$, $Y_2(CO_3)_3$, $Y(CH_3COO)_3$ and $Y_2(C_2O_4)_3$. Any one of these Y compounds shows an excellent anticorrosive effect when being contained in the corrosion-resistant film, though the effects are different to some extent according to the type.

In the corrosion-resistant structure for the high-temperature water system, the structural material (structural member) is preferably at least one structural material selected from a carbon steel, a copper alloy and an Ni-based alloy. Any one of the carbon steel, the copper alloy and the Ni-based alloy can effectively prevent the elution of its metal component even though the above described structural material is any one of them.

In the corrosion-resistant structure for the high-temperature water system, the deposition amount of La is preferably 1 μg/cm² or more and 200 μg/cm² or less. When the deposition amount of La is in the above described range, a high corrosion-preventing effect can be obtained. On the other hand, even when the deposition amount of La exceeds the upper limit of the above described range, the corrosion-preventing effect results in being saturated.

Furthermore, in the above corrosion-resistant structure for the high-temperature water system, the deposition amount of Y is preferably 1 μg/cm² or more and 200 μg/cm² or less. When the deposition amount of Y is in the above described range, a high corrosion-preventing effect is obtained. On the other hand, even when the deposition amount of Y exceeds the upper limit of the above described range, the corrosion-preventing effect results in being saturated, similarly to the La compound.

In addition, a corrosion-preventing method for a high-temperature water system according to the present invention for preventing a corrosion of a structural material constituting the high-temperature water system through which a cooling water of high temperature passes includes steps of: preparing a corrosion inhibitor containing at least one of La and Y; and depositing a prepared corrosion inhibitor on a surface in a side of the structural material, which comes in contact with the cooling water, and forming a corrosion-resistant film thereon.

In the above description, it is preferable to previously subject a surface in a side on which the structural material comes in contact with the cooling water, to any one treatment among machining treatment, immersion treatment in high-temperature water and chemical cleaning treatment, before depositing the corrosion-resistant film. In other words, when a cooling water contact surface of the structural material is previously subjected to the machining treatment such as grinding by a liner or the like, thereby an oxide film and a foreign substance of the surface portion are removed and a newly-formed surface is made to appear, the newly-formed surface can enhance an adhesion strength of the corrosion-resistant film.

In addition, it is preferable that the structural material is subjected to the treatment of immersion into a high-temperature water of 200° C. to 350° C., thereby an oxide film of the structural material is formed on the surface of the structural material (substrate, base member) and the corrosion resistant film is formed on the surface of this oxide film. This oxide film further enhances a function of the corrosion-resistant film containing La and Y, and can further enhance the corrosion-preventing effect.

Furthermore, when the structural material is previously subjected to a chemical cleaning treatment of cleaning the cooling water contact surface of the structural material with an acid or the like, thereby to remove the oxide and the foreign substance and to make a newly-formed surface appear, the newly-formed surface can enhance an adhesion strength of the corrosion-resistant film, similarly to the above described case of the structural material which has been subjected to the machining treatment.

In addition, in the above described corrosion-preventing method for the high-temperature water system, the above described method of depositing the corrosion inhibitor on the surface of the structural material is preferably any one of a spray method, a CVD method, a thermal spray method and an immersion method in which the structural material is immersed into a high-temperature water containing the corrosion inhibitor.

The above described spray method is a method of spraying the corrosion inhibitor onto the surface of the structural material with a high pressure gas such as nitrogen gas; the CVD method is a method of chemically vaporizing the corrosion inhibitor, and vapor-depositing the corrosion inhibitor on the surface of the structural material; the thermal spray method is a method of spraying a melted corrosion inhibitor onto the surface of the structural material so as to cover the surface with the melted corrosion inhibitor; and the immersion method is a method of immersing the structural material into the high-temperature water containing the corrosion inhibitor and depositing the corrosion inhibitor on the surface of the structural material. Any method can be more promptly and easily applied to the structural material, in comparison with a conventional operation of controlling a water chemistry of a cooling material.

Advantageous Effects of the Invention

According to the corrosion-resistant structure and the corrosion-preventing method for the high-temperature water system of the present invention, a corrosion-resistant film formed from a substance containing at least one of La and Y is deposited on a surface of a structural material, accordingly the structural material can be effectively prevented from causing corrosion, and an elution of a metal component such as iron from the cooling water contact face of the structural material can be greatly reduced. In addition, the above described corrosion-resistant film shows an excellent corrosion-preventing effect even when the deposition amount is small, and on the other hand, maintains the corrosion-preventing effect for a long period of time because of having high adhesion strength between the corrosion-resistant film and the structural material.

BRIEF DESCRIPTION OF THE DRAWINGS

FIG. 1A is a view of an example in which a corrosion-resistant film containing La is formed on a surface of a structural material (substrate, base member) having an oxide film formed thereon; and FIG. 1B is a cross-sectional view illustrating an example in which a corrosion-resistant preventing film containing La is directly formed on a surface of a structural material from which an oxide film has been removed.

MODE FOR CARRYING OUT THE INVENTION

Examples of the corrosion-resistant structure and the corrosion-preventing method for the high-temperature water system according to the present invention will be more specifically described hereinbelow with reference to the attached drawings.

Example 1

Firstly, an example of the present invention in which a corrosion-resistant film containing a La compound as a corrosion inhibitor is formed on a structural material will be concretely described below with reference to the attached FIGS. 1A and 1B and FIG. 2.

Figure 1A:
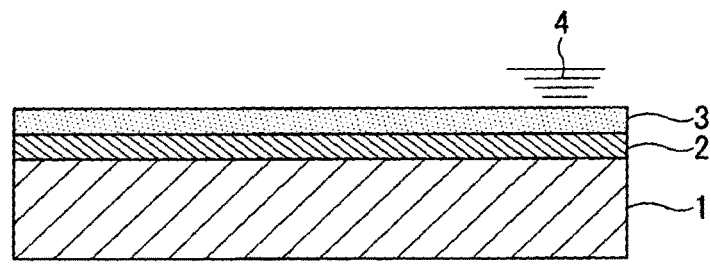
FIGS. 1A and 1B are cross-sectional views illustrating examples of a corrosion-suppressing structure for conducting a corrosion-resistant structure and a corrosion-preventing method for a high-temperature water system according to the present invention.
Figure 1B:
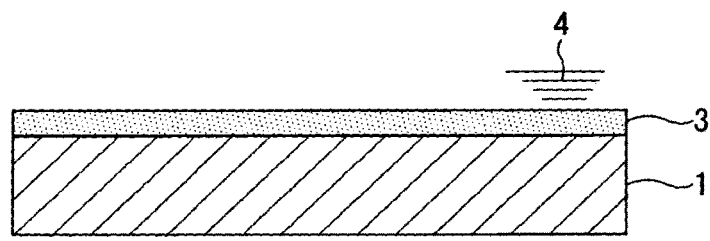
Figure 2:
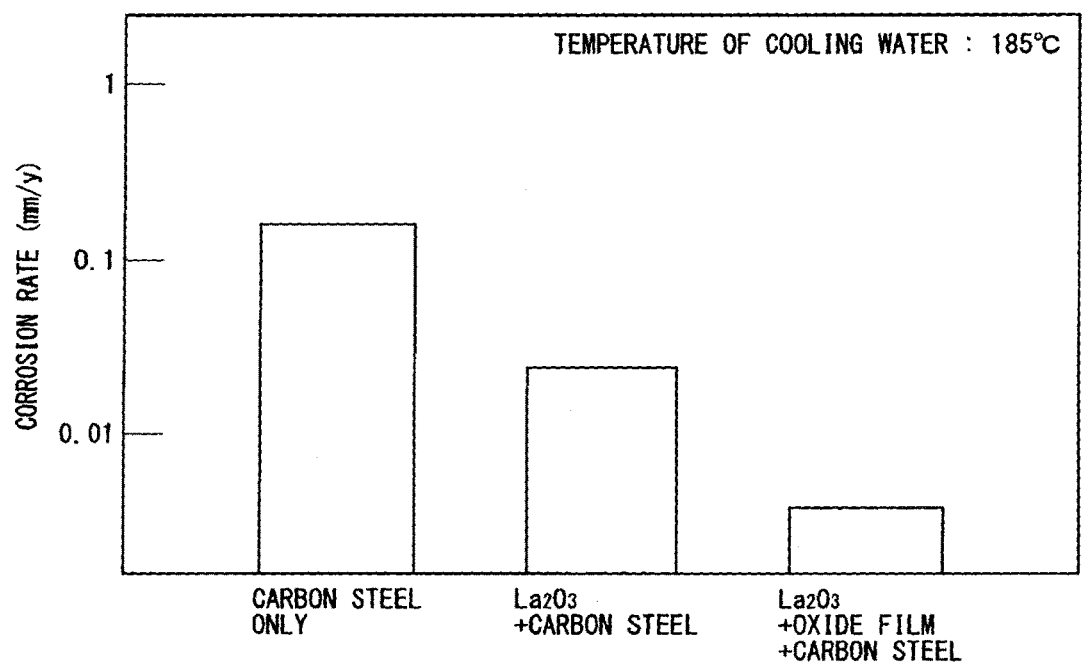
FIG. 2 is a graph illustrating a relationship between a corrosion-suppressing effect and the corrosion-resistant structure, in the corrosion-resistant structures illustrated in FIGS. 1A and 1B.

A corrosion-resistant structure for a high-temperature water system according to the present example 1 includes two types of structures, as are illustrated in FIGS. 1A and 1B and FIG. 2. Specifically, FIG. 1A is a view of an example in which a corrosion-resistant film 3 formed from $La_2O_3$ has been formed on the surface of a carbon steel that is used as a structural material (substrate, base member) 1 and has a uniform oxide film 2 formed thereon; and FIG. 1B is a view illustrating an example (test piece) in which the corrosion-resistant film 3 formed from $La_2O_3$ has been directly formed on a surface of the structural material 1 from which an ununiform oxide film has been previously removed.

For information, the oxide film 2 in FIG. 1A was formed by oxidizing a surface portion of the carbon steel which was used as the structural material 1, in the atmosphere of 150° C. In addition, a carbon steel 1 that was used as the structural material in FIG. 1B had a newly-formed surface exposed thereon which had a smooth and uniform surface roughness, by acid-pickling the surface.

Next, a test piece was prepared as a Comparative Example (reference) which was formed only from a carbon steel and did not have an oxide film and a corrosion-resistant film formed thereon, in addition to the two types of the examples in which the corrosion-resistant film was prepared by depositing $La_2O_3$ on the carbon steel as was described above. The surface portions of these three types of the test pieces were subjected to a corrosion test under conditions of being immersed in the hot water which contained less than 5 ppb of dissolved oxygen and had a pH of 9.8 at a temperature of 185° C. under a pressure of 4 MPa, for 500 hours. Corrosion amounts (corrosion rates) were calculated from weight changes before and after the corrosion test of each test piece. The measurement calculation results are shown in FIG. 2.

As is clear from the result illustrated in FIG. 2, it was proved that the corrosion rates were remarkably suppressed in the two types of the test pieces in the example in which the corrosion-resistant film 3 formed from $La_2O_3$ was deposited, in comparison with the test piece formed only from the carbon steel. In addition, it was also confirmed that the corrosion-suppressing effect became more remarkable when the oxide film 2 existed. Thus, it was proved that the corrosion-suppressing function for the carbon steel could be effectively shown by $La_2O_3$ which was deposited on the surface of the structural material.

It is expected according to the above described experimental results that an effect of suppressing general corrosion due to a cooling water and an effect of suppressing a wall thinning phenomenon due to flow-accelerated corrosion can be exhibited by an La-containing compound which has been deposited on a surface of a carbon steel material constituting a secondary cooling system of a pressurized-water type atomic power generation facility.

For information, it is confirmed by an experiment that the above described corrosion-preventing effect is not limited to the case in which $La_2O_3$ was used as the corrosion inhibitor but the similar effect can be shown also in the case in which $La(OH)_3$, $La_2(CO_3)_3$, $La(CH_3COO)_3$ or $La_2(C_2O_4)_3$ was used as the corrosion inhibitor to be deposited on the surface.

Example 2

Next, an example of the present invention, in which a corrosion-resistant film containing a Y compound as a corrosion inhibitor has been formed on a structural material, will be described below with reference to the attached FIG. 3.

A corrosion resistant structure for a high-temperature water system according to the present example has a structure as is illustrated in a schematic view FIG. 1B. Specifically, a surface of a test piece of the present example is a newly-formed surface which is exposed by removing the oxide film with chemicals. $Y(OH)_3$ was used as a corrosion inhibitor.

Then, a corrosion-resistant film 3 was formed with the use of a spray coating method of spraying a chemical agent containing $Y(OH)_3$ onto the cooling water contact surface of a carbon steel together with nitrogen gas and depositing the chemical agent. As a result of having examined a state of the formed corrosion-resistant film 3 through SEM observation, it was confirmed that a spot-shaped lump of $Y(OH)_3$ of a micrometric order was formed on a surface portion of the carbon steel. It was proved from this observation result that the deposition uniformity of the corrosion-resistant film 3 was low and the deposition amount of $Y(OH)_3$ was 90 $\mu g/cm^2$, but that the film thickness considerably dispersed or scattered depending on the site of the carbon steel.

Next, a test piece was prepared as a Comparative Example (reference) which was formed only from a carbon steel and did not have an oxide film and a corrosion-resistant film formed thereon, in addition to the example in which the corrosion-resistant film was prepared by depositing $Y(OH)_3$ on the carbon steel as was described above. The surface portions of these two types of the test pieces were subjected to a corrosion test under conditions of being immersed in the hot water which contained less than 5 ppb of dissolved oxygen and had a pH of 9.8 at a temperature of 185° C. under a pressure of 4 MPa, for 500 hours, in a similar way to that in Example 1. Corrosion amounts (corrosion rates) were calculated from weight changes before and after the corrosion test of each test piece. The measurement calculation results are shown in FIG. 3.

Figure 3:
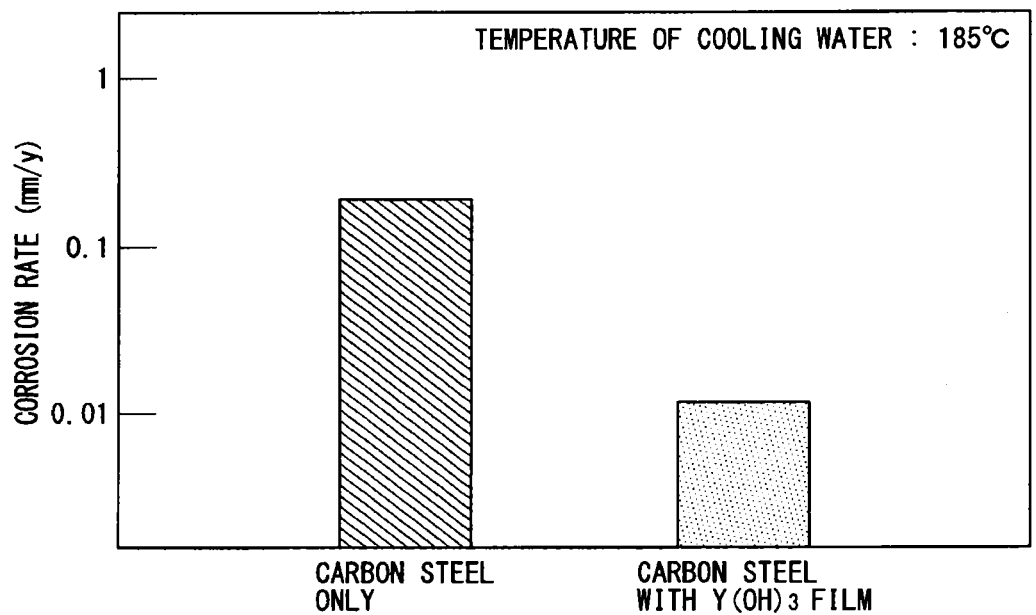
FIG. 3 is a graph illustrating a corrosion-suppressing effect of a corrosion-resistant structure which has a corrosion-resistant film formed from $Y(OH)_3$ formed thereon.

As is clear from the result illustrated in FIG. 3, it was proved that the corrosion rate was suppressed to approximately one-tenth in the test piece in Example 2 in which the corrosion-resistant film formed from $Y(OH)_3$ was deposited, and that an excellent corrosion-preventing effect could be shown, in comparison with the test piece formed only from the carbon steel. Thus, it was proved that the corrosion-suppressing function for the carbon steel could be effectively shown by $Y(OH)_3$ which was deposited on the surface of the structural material.

It is expected on the basis of the above described experimental result that an effect of suppressing general corrosion of the structural material and an effect of suppressing a wall thinning phenomenon due to flow-accelerated corrosion are shown when $Y(OH)_3$ has been deposited on a surface of a structural material constituting a secondary cooling system of a pressurized-water type atomic power generation facility.

In addition, it is confirmed by an experiment that the above described corrosion-preventing effect is not limited to the case in which $Y(OH)_3$ was used as a corrosion inhibitor, but that the similar effect can be shown also in the case in which $Y_2(CO_3)_3$, $Y(CH_3COO)_3$ or $Y_2(C_2O_4)_3$ was used as the corrosion inhibitor to be deposited on the surface of the structural material.

Example 3

Next, an influence which a difference of an operation temperature (temperature of cooling water) gives on a corrosion-resistant structure will be described below with reference to the following Example 3 and FIG. 4.

A corrosion-resistant structure for a high-temperature water system according to the present Example 3 has a structure as is illustrated in a schematic view FIG. 1B. Specifically, a test piece used for the test piece of the present example was in such a state that the surface of a carbon steel before a corrosion-resistant film was deposited thereon had been polished and degreased by a sandpaper with #600, and that an oxide film and a foreign substance had been removed therefrom.

Then, the test piece according to Example 3 was prepared by depositing $Y(OH)_3$ onto the surface (newly-formed surface) of this carbon steel with a spray method. A deposition amount of $Y(OH)_3$ in this test piece was set at 50 $\mu g/cm^2$ by adjustment of a spraying period of time. As a result of having examined a state of the formed corrosion-resistant film 3 through SEM observation, the uniformity was low similarly to that in Example 2.

Next, a test piece was prepared as a Comparative Example which was formed only from a carbon steel and did not have an oxide film and a corrosion-resistant film formed thereon, in addition to the example in which the corrosion-resistant film was prepared by depositing $Y(OH)_3$ on the carbon steel as was described above.

Then, the surface portions of these two types of the test pieces were subjected to a corrosion test under conditions of being immersed in the hot water which contained 5 ppb or less of dissolved oxygen and had a pH of 9.8 at a temperature in two levels of 150° C. and 280° C. under a pressure of 4 MPa and 8 MPa, for 500 hours, in a similar way to that in Example 1. Corrosion amounts (corrosion rates) were calculated from weight changes before and after the corrosion test of each test piece. The measurement calculation result is shown in FIG. 4.

Figure 4:
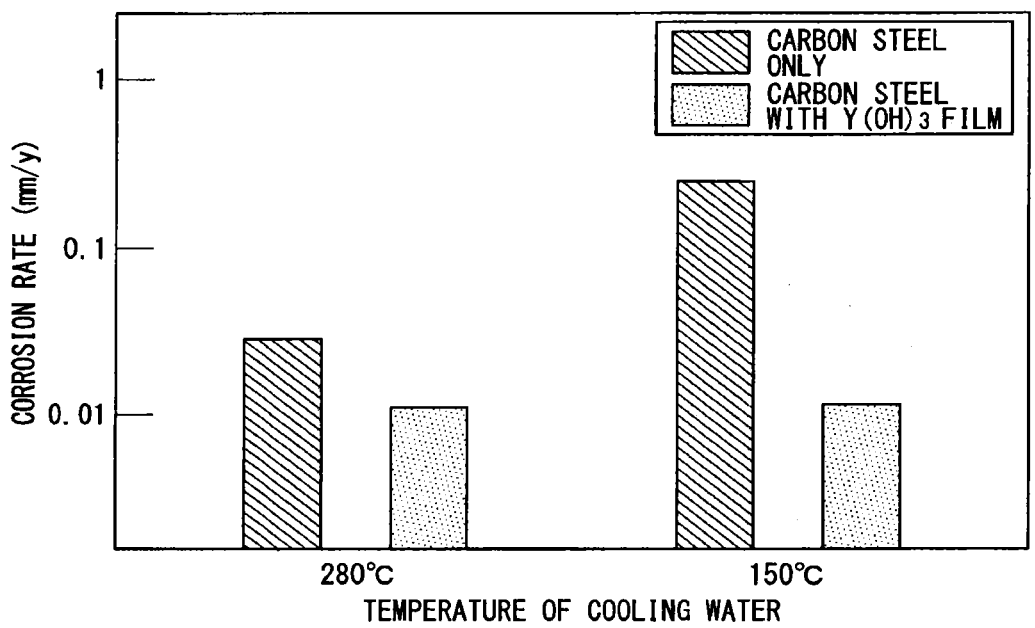
FIG. 4 is a graph illustrating an influence of a temperature change of a corrosion-resistant structure having the corrosion-resistant film formed from $Y(OH)_3$ formed thereon.

As is clear from the result illustrated in FIG. 4, the corrosion amount of the test piece formed only from the carbon steel also decreases under the condition that the temperature is as high as 280° C. This is considered to be because the formed oxide film has high stability because the temperature is high.

On the other hand, it is understood that the corrosion rate becomes large when the temperature is 150° C. because the solubility of the oxide film to be formed under the condition of the present test is high, and that the corrosion-suppressing function works due to the deposition of $Y(OH)_3$. Therefore, the corrosion-resistant structure can be applied in such an environment that a cooling water is 20° C. or higher and 350° C. or lower which is an operation temperature of a secondary cooling system of a pressurized-water type atomic power generation facility, in view of the fact that $Y(OH)_3$ is resistant to high temperature.

In addition, as is clear from FIG. 4, the corrosion-resistant structure according to the present example is particularly effective in a range of an operation temperature of 150° C. or higher after a deaerator, in a secondary cooling system of a pressurized-water type atomic power generation facility, and it is expected that an effect of suppressing an general corrosion of a structural material and a function of suppressing a wall thinning phenomenon due to flow-accelerated corrosion are effectively shown when a chemical agent containing Y is injected into the system and is deposited on a surface of a structural material.

Example 4

Next, an influence which a difference of a deposition amount of a corrosion inhibitor to be deposited on a surface of a structural material gives on a corrosion amount will be described below with reference to the following Example 4 and FIG. 5.

A corrosion-resistant structure for a high-temperature water system according to the present Example 4 has a structure as is illustrated in a schematic view FIG. 1B. Specifically, a test piece used for the test piece of the present Example 4 was in such a state that the surface of a carbon steel before a corrosion-resistant film was deposited thereon had been polished and degreased by a sandpaper with #600, and an oxide film and a foreign substance had been removed therefrom.

Then, a large number of two types of test pieces according to Example 4 were prepared by depositing $La_2O_3$ or $Y(OH)_3$ onto the surface (newly-formed surface) of this carbon steel with a spray method. For information, a deposition amount of $La_2O_3$ or $Y(OH)_3$ was varied and adjusted in a range of 0 to 300 $\mu g/cm^2$ by adjustment of a spraying period of time.

Next, a test piece was prepared as a Comparative Example which was formed only from a carbon steel and did not have an oxide film and a corrosion-resistant film formed thereon, in addition to the example in which the corrosion-resistant film was prepared by depositing $La_2O_3$ or $Y(OH)_3$ on the surface of the carbon steel as was described above.

Then, the surface portions of these test pieces were subjected to a corrosion test under conditions of being immersed in the hot water which contained 5 ppb or less of dissolved oxygen and had a pH of 9.8 at a temperature of 185° C. under a pressure of 4 MPa, for 500 hours, in a similar way to that in Example 1. Corrosion amounts (corrosion rates) were calculated from weight changes before and after the corrosion test of each test piece. The measurement calculation result is shown in FIG. 5.

Figure 5:
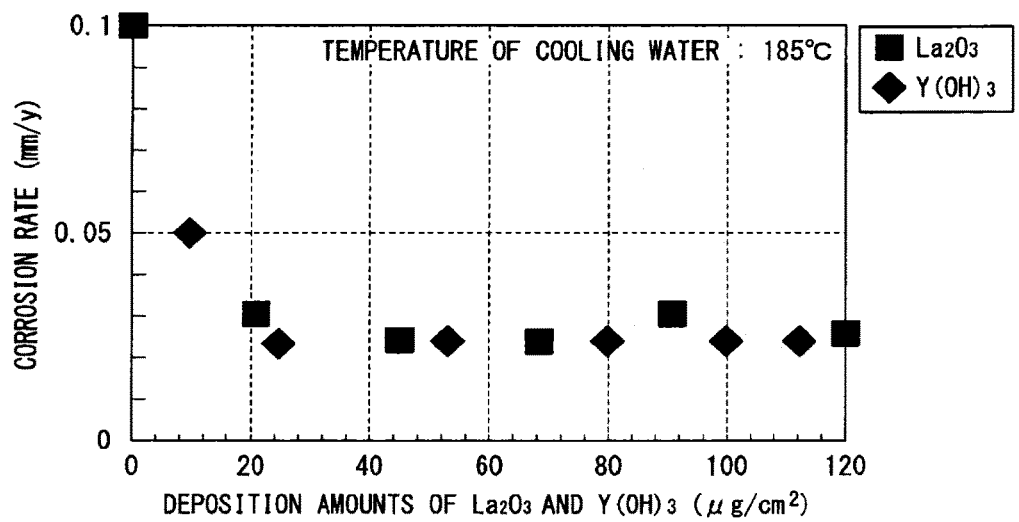
FIG. 5 is a graph illustrating a relationship between deposition amounts of corrosion-resistant films and corrosion amounts (corrosion rate) of structural members.

As is clear from the result illustrated in FIG. 5, it was confirmed that the corrosion amount tended to decrease and the corrosion-suppressing effect tended to increase, as the deposition amount of the corrosion-resistant film increased. It was also confirmed that the corrosion-suppressing effect was saturated and the corrosion rates reached approximately a same level, in a range of a deposition amount of 20 $\mu g/cm^2$ or more. Accordingly, the deposition amount of the corrosion-resistant film is necessary and sufficient to be in the range of 20 to 120 $\mu g/cm^2$.

Here, a deposition amount of the corrosion inhibitor remaining on a surface of the test piece of which the deposition amount had been set to approximately 50 $\mu g/cm^2$ before the corrosion test was examined after the corrosion test, and as a result, it was confirmed that the deposition amount was 1 $\mu g/cm^2$ or less.

As a result, it was confirmed that the corrosion-preventing effect continued as long as a fixed deposition amount of an La-containing or Y-containing chemical agent was attained in an initial stage of the application, even though the deposition amount was not always kept constant or the deposition amount decreased due to an exfoliation of the deposited chemical agent during an operation period.

It is technically difficult to uniformly deposit the present corrosion inhibitor on the surface of the structural material of the secondary cooling system of the pressurized-water type atomic power generation facility so that the deposition amount becomes uniform, and it is anticipated that the deposition amount of the corrosion inhibitor greatly varies according to an influence of a flow of a cooling water, and depending on a temperature of the cooling water and a structure of the high-temperature water system.

However, such a technological knowledge is an important premise for the technology that an initial corrosion-preventing effect develops even when the deposition amount of the corrosion inhibitor has greatly varied depending on the site of the structural body as has been described above, and is extremely useful when the technology is applied to an actual apparatus.

Example 5

Next, an influence which a difference between methods of depositing a corrosion inhibitor on a surface of a structural material gives will be described below with reference to the following Example 5 and FIG. 6.

A corrosion-resistant structure for a high-temperature water system according to the present Example 5 has a structure as is illustrated in a schematic view FIG. 1B. Specifically, a test piece used for the test piece of the present Example 5 was in such a state that the surface of a carbon steel before a corrosion-resistant film was deposited thereon had been polished and degreased by a sandpaper with #600, and an oxide film and a foreign substance had been removed therefrom.

Then, two types of test pieces according to Example 5 were prepared by depositing $La_2O_3$ onto the surface (newly-formed surface) of this carbon steel with a spray method or a chemical deposition method of injecting a chemical substance into a high-temperature water and depositing the chemical substance. In the above description, the deposition amount of $La_2O_3$ was adjusted to 50 $\mu g/cm^2$ by adjustment of a spraying period of time or an amount of the chemical agent to be injected into the high-temperature water.

Here, the above described chemical deposition method is a method of making a substance to be deposited exist in a fluid, and depositing the substance onto a surface of a structural material by a flow of the fluid.

Next, the surface portions of the two types of the test pieces which were prepared by depositing $La_2O_3$ on the surface of the carbon steel with different methods as was described above were subjected to a corrosion test under conditions of being immersed in the hot water that contained 5 ppb or less of dissolved oxygen and had a pH of 9.8 at a temperature of 185° C. under a pressure of 4 MPa, for 500 hours, in a similar way to that in Example 1. Then, corrosion amounts (corrosion rates) were calculated from weight changes before and after the corrosion test of each test piece. The measurement calculation result is shown in FIG. 6.

Figure 6:
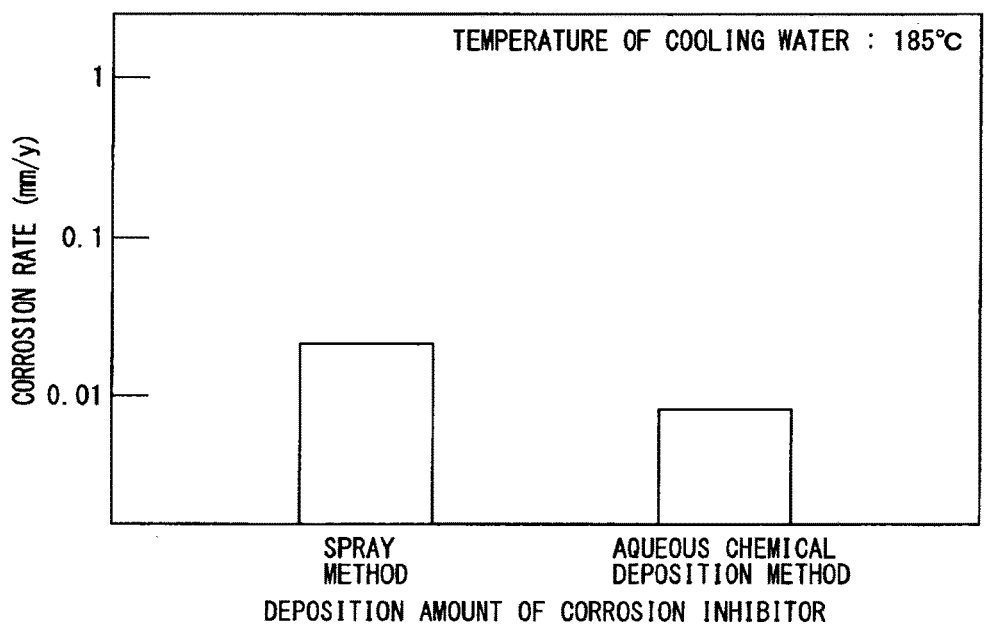
FIG. 6 is a graph illustrating a relationship between a method for forming the corrosion-resistant film and a corrosion amount of a structural member.

As is clear from the result illustrated in FIG. 6, the corrosion-resistant film which had been deposited and formed with the chemical deposition method was different from and could be more uniformly deposited than the corrosion-resistant film which had been formed with the spray method, and it was confirmed that the corrosion-resistant film which had been formed with the chemical deposition method had a greater corrosion-rate-suppressing function.

It is expected that the deposition of the corrosion-resistant film having high uniformity can be achieved by injecting an La-containing substance into a high-temperature cooling water during an operation of the secondary cooling system of the pressurized-water type atomic power generation facility and by depositing the substance onto the surface of the structural material, and that thereby an effect of suppressing general corrosion and an effect of suppressing a wall-thinning phenomenon due to flow-accelerated corrosion are shown. A similar effect can be shown also when a Y-containing substance has been injected into the high-temperature cooling water.

Example 6

Next, an effect appearing when $La(OH)_3$ or $Y_2(CO_3)_3$ as other corrosion inhibitors has been deposited on a surface of a structural material will be described below with reference to the following Example 6 and FIG. 7.

A corrosion-resistant structure for a high-temperature water system according to the present Example 6 has a structure as is illustrated in a schematic view FIG. 1B. Specifically, a test piece used for the test piece of the present Example 6 was in such a state that the surface of a carbon steel before a corrosion-resistant film was deposited thereon had been polished and degreased by a sandpaper with #600, and an oxide film and a foreign substance had been removed therefrom.

Then, two types of test pieces according to Example 6 were prepared by depositing $La(OH)_3$ or $Y_2(CO_3)_3$ onto the surface (newly-formed surface) of this carbon steel with the use of a spray method. For information, a deposition amount of $La(OH)_3$ or $Y_2(CO_3)_3$ was adjusted to 50 µg/cm$^2$ by adjustment of a spraying period of time.

Next, the surface portions of the two types of the test pieces which were prepared by depositing $La(OH)_3$ or $Y_2(CO_3)_3$ on the surface of the carbon steel as was described above were subjected to a corrosion test under conditions of being immersed in the hot water that contained 5 ppb or less of dissolved oxygen and had a pH of 9.8 at a temperature of 185° C. under a pressure of 4 MPa, for 500 hours, in a similar way to that in Example 1. Then, corrosion amounts (corrosion rates) were calculated from weight changes before and after the corrosion test of each test piece. The measurement calculation result is shown in FIG. 7.

Figure 7:
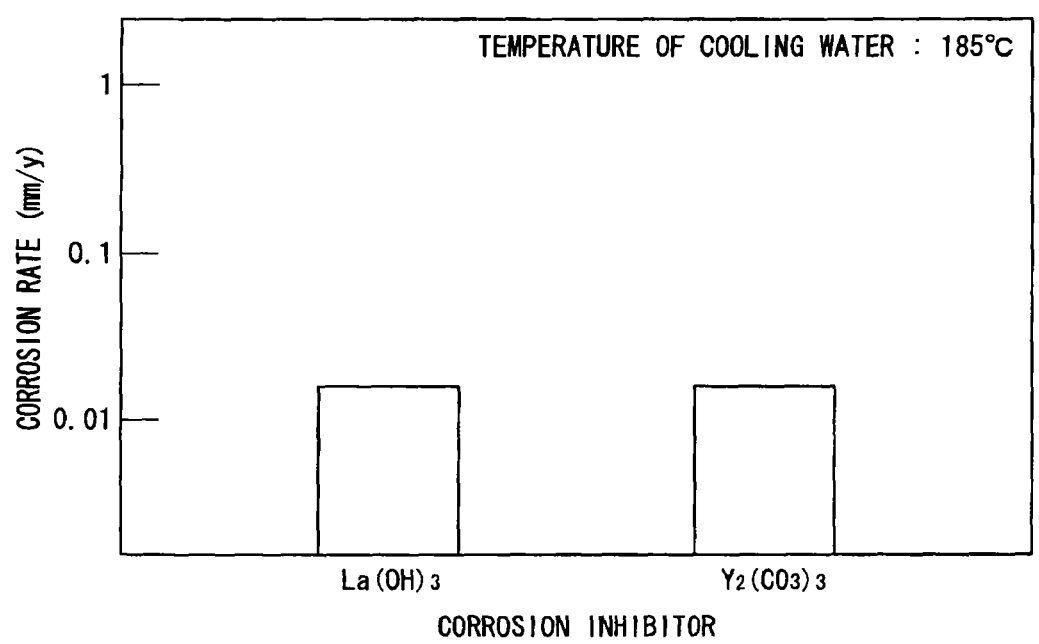
FIG. 7 is a graph illustrating a relationship between the type of chemical compounds (corrosion inhibitor) contained in corrosion-resistant films and the corrosion-suppressing effect.

As is clear from the results illustrated in FIG. 7, when the corrosion amounts of the two types of the test pieces which were prepared by depositing $La(OH)_3$ or $Y_2(CO_3)_3$ on the surface of the carbon steel were compared to each other, the corrosion amounts were not greatly different from each other, but it was confirmed that when the two types of the test pieces were compared to the test piece formed only from the carbon steel illustrated in Examples 1 and 2, the corrosion rates were remarkably suppressed.

It was experimentally proved that a great corrosion-preventing effect was obtained by depositing and forming a hydroxide of La or a carbonate of Y on the surface of the structural material as in the above described Example 6. Accordingly, it is expected that an effect of suppressing general corrosion of the structural material and an effect of suppressing a wall thinning phenomenon due to flow-accelerated corrosion are shown also when the hydroxide and the carbonate are deposited on the surface of the structural material in the secondary cooling system of the pressurized-water type atomic power generation facility.

INDUSTRIAL APPLICABILITY

According to the corrosion-resistant structure and the corrosion-preventing method for the high-temperature water system of the embodiments of the present invention, a corrosion-resistant film formed from a substance containing at least one of La and Y is deposited on the surface of the structural material, accordingly the structural material can be effectively prevented from causing corrosion, and an elution of a metal component such as iron from the cooling water contact surface of the structural material can be greatly reduced. In addition, the above described corrosion-resistant film shows an excellent corrosion-preventing effect even when the deposition amount is small, and on the other hand, can maintain the corrosion-preventing effect for a long period of time because of having high adhesion strength between the corrosion-resistant film and the structural material.

DESCRIPTION OF SYMBOLS

1 Structural material (carbon steel)
2 Oxide film (Oxide layer)
3 Corrosion-preventing film ($La_2O_3$ film, $Y(OH)_3$ film, $La(OH)_3$ film or $Y_2(CO_3)_3$ film)
4 Cooling water (Coolant)

The invention claimed is:

1. A corrosion-resistant structure for a high-temperature water system, comprising:
    a structural material that constitutes a secondary cooling system of a pressurized-water nuclear power plant; and
    a corrosion-resistant film formed from a substance comprising Y deposited on a surface in a side that comes in contact with a cooling water having a temperature of 20° C. or higher and 350° C. or lower, of the structural material which constitutes the high-temperature water system that passes a cooling water of high temperature therein,
    wherein the corrosion-resistant film consists of at least one compound selected from the group consisting of $Y_2(CO_3)_3$, $Y(CH_3COO)_3$ and $Y_2(C_2O_4)_3$.

2. The corrosion-resistant structure for the high-temperature water system according to claim 1, wherein the structural material is at least one structural material selected from the group consisting of a carbon steel, a copper alloy and a Ni-based alloy.

3. The corrosion-resistant structure for the high-temperature water system according to claim 1, wherein a deposition amount of the substance comprising Y is 1 µg/cm$^2$ or more and 200 µg/cm$^2$ or less.

4. The corrosion-resistant structure for the high-temperature water system according to claim 1, wherein an oxide film of the structural material is formed on a surface of the structural material, and the corrosion-resistant film is formed on a surface of the oxide film.

5. The corrosion-resistant structure for a high-temperature water system according to claim 1, wherein the corrosion-resistant film consists of the substance comprising Y in an amount of from 20 μg/cm² to 120 μg/cm².

6. The corrosion-resistant structure for a high-temperature water system according to claim 1, which is a heat exchanger.

7. The corrosion-resistant structure for a high-temperature water system according to claim 1, which is a steam generator.

8. A pressurized-water atomic power generation system facility, comprising:

a boiler, a steam generator and a heat exchanger, where the boiler, the steam generator and the heat exchanger are in fluid connection and at least one of the boiler, the steam generator and the heat exchanger is the corrosion-resistant structure for the high-temperature water system according to claim 1.

9. The corrosion-resistant structure for a high-temperature water system according to claim 1, wherein the corrosion-resistant film consists of $Y_2(CO_3)_3$.

10. The corrosion-resistant structure for a high-temperature water system according to claim 1, wherein the corrosion-resistant film consists of $Y(CH_3COO)_3$.

11. The corrosion-resistant structure for a high-temperature water system according to claim 1, wherein the corrosion-resistant film consists of $Y_2(C_2O_4)_3$.

12. The corrosion-resistant structure for a high-temperature water system according to claim 1, wherein the corrosion-resistant film is a uniform and continuous film covering the surface.

* * * * *